(12) United States Patent
He et al.

(10) Patent No.: US 10,216,471 B1
(45) Date of Patent: Feb. 26, 2019

(54) AIRCRAFT SYSTEMS AND METHODS FOR UNUSUAL ATTITUDE RECOVERY

(71) Applicant: HONEYWELL INTERNATIONAL INC., Morris Plains, NJ (US)

(72) Inventors: Gang He, Morristown, NJ (US); Jason F. Harvey, Glendale, AZ (US); Ivan Sandy Wyatt, Scottsdale, AZ (US); Thea L. Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 7 days.

(21) Appl. No.: 15/679,405

(22) Filed: Aug. 17, 2017

(51) Int. Cl.
*G01C 5/00* (2006.01)
*G06F 3/147* (2006.01)
*B64D 43/00* (2006.01)

(52) U.S. Cl.
CPC .............. *G06F 3/147* (2013.01); *B64D 43/00* (2013.01)

(58) Field of Classification Search
CPC ................................ G06F 3/147; B64D 43/00
See application file for complete search history.

(56) References Cited

U.S. PATENT DOCUMENTS

| | | | |
|---|---|---|---|
| 8,275,516 B2 * | 9/2012 | Murphy | A01B 69/00 701/124 |
| 2009/0157240 A1 | 6/2009 | Conner et al. | |
| 2014/0218216 A1 * | 8/2014 | Conner | B64D 45/00 340/967 |

FOREIGN PATENT DOCUMENTS

EP  0704677 A1  4/1996

OTHER PUBLICATIONS

Image Gallery: Navigation Screen; Retrieved from Internet: http://keywordsuggest.org/gallery/1263607.html; Jun. 27, 2017.

* cited by examiner

*Primary Examiner* — Adam M Alharbi
(74) *Attorney, Agent, or Firm* — Lorenz & Kopf, LLP (57) ABSTRACT

A vehicle system and method are provided. The system includes a processor configured to compare received data representative of a current attitude with predetermined bank, nose up, and nose down values to determine that an occurrence of unusual attitude is currently underway. Upon determining that an occurrence of unusual attitude conditions is currently underway, the system and method generate display signals that command and control a display system to render roll angle alert symbology. The roll angle alert symbology includes a tracing arrowhead that more clearly shows the direction to recover from unusual attitude conditions. Based in part on the tracing nature of the arrowhead, provided technological improvements are observable on display systems that are monochrome, as well as those with color. In various embodiments, color attributes and confining the dynamic tracing performed by the arrowhead more clearly inform a pilot of the roll recovery direction to recover from unusual attitude conditions.

20 Claims, 6 Drawing Sheets

AIRCRAFT SYSTEMS AND METHODS FOR UNUSUAL ATTITUDE RECOVERY

TECHNICAL FIELD

The present invention generally relates to aircraft system and displays, and more particularly relates to aircraft display systems and methods that assist in unusual attitude recovery.

BACKGROUND

Aircraft and aircraft systems continue to advance in sophistication, particularly with respect to aircraft display systems. Flight instruments and associated displays are used on aircraft to integrate information from data sources and to perform, or assist a user in performing, functions related to, for example, flight planning, guidance and navigation, and performance management. The easier it is for the pilot to obtain and understand the information provided by these instruments and displays, the more likely that the pilot will be able to successfully fly the aircraft.

One type of flight display system is an attitude indicator that informs the pilot of the orientation of the aircraft relative to earth. Such attitude indicators indicate the pitch (fore and aft tilt, also referred to as nose up and nose down) and bank (side to side tilt, also referred to as roll) of the aircraft. Although attitude indicators are common in aircraft, any improvement that enhances situational awareness and control of the aircraft is beneficial.

Accordingly, it is desirable to provide improved aircraft display systems and methods. Specifically, it is desirable to provide aircraft display systems and methods to assist in attitude recovery during conditions described as "unusual attitude," in which a combination of bank and/or pitch has exceeded respective predetermined values considered non-desirable for normal operation. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A vehicle system is provided. The vehicle system comprising: a memory device; and a processor coupled to the memory device, the processor configured to: receive current attitude data; process the current attitude data with a predetermined bank angle; determine an associated roll angle correction direction upon determining a current bank angle value is greater than an absolute value of the predetermined bank angle; generate display commands responsive to the roll angle correction direction; and a display device configured to receive the display commands and, responsive thereto, to selectively render an image including roll angle alert symbology, the roll angle alert symbology comprising a curved arrow having the characteristics of (i) extending in the roll angle correction direction from a starting point to an ending point, (ii) a first arrowhead associated with the ending point, and (iii) a second arrowhead aligned in the same direction as the first arrowhead, wherein the second arrowhead dynamically traces the curved arrow from a beginning point to the ending point, and then back to the beginning point.

A vehicle display method is also provided. The method comprising: receiving current attitude data from attitude sensors; processing the current attitude data with a predetermined bank, a predetermined nose up and a predetermined nose down; determining an associated roll angle correction direction upon determining a current bank is greater than an absolute value of the predetermined bank; and generating display commands responsive to the roll angle correction direction; and at a display device, receiving the display commands and, responsive thereto, to selectively rendering an image including roll angle alert symbology, the roll angle alert symbology comprising a curved arrow having the characteristics of (i) extending in the roll angle correction direction from a starting point to an ending point, (ii) a first arrowhead associated with the ending point, and (iii) a second arrowhead aligned in the same direction as the first arrowhead, wherein the second arrowhead dynamically traces the curved arrow from a beginning point to the ending point, and then back to the beginning point.

A dynamic unusual attitude roll recovery system for an aircraft is provided. The system comprising: a control module comprising a memory device and a processor, the control module configured to: receive current attitude data; and process the current attitude data with a predetermined bank; and while a current bank is greater than an absolute value of the predetermined bank, determine an associated roll angle correction direction, and generate display commands responsive to the roll angle correction direction; and a display device configured to receive the display commands and, responsive thereto, to selectively render an image including roll angle alert symbology, the roll angle alert symbology comprising a curved arrow having the characteristics of (i) extending in the roll angle correction direction from a starting point to an ending point, (ii) a first arrowhead associated with the ending point, (iii) a first and a second subsection, each rendered in a manner that is visually distinct from the other, the first subsection comprising the first arrowhead and indicating a desired side to roll toward and the second section comprising the starting point and indicating an undesirable side to roll to, and (iv) a second arrowhead aligned in the same direction as the first arrowhead, wherein the second arrowhead dynamically traces the first curved arrow from a beginning point to the ending point, and then back to the beginning point, and the beginning point is in between the starting point and the ending point on the curved arrow.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, electronic flight information system (EFIS) or aircraft flight control system (FCS).

Exemplary embodiments of the disclosed control module provide an enhancement over conventional Attitude Direction Indicators (ADI), in part, by defining an unusual attitude occurrence, and then determining when it is currently occurring. In operation, the novel control module 104 processes current attitude with predetermined bank and predetermined pitch (nose up or nose down) threshold information. Upon determining that current conditions indicate that an "unusual attitude" is currently underway, a roll angle alert may be asserted. As defined herein, "unusual attitude" is one or combination of the following conditions: (i) a current bank angle is greater than an absolute value of the predefined left bank angle; (ii) a current bank angle is greater than an absolute value of the predefined right bank angle; (iii) a current pitch angle value is greater than the absolute value of the predetermined pitch up angle; and (iv) a current pitch angle value is greater than the absolute value of the predetermined pitch down angle. The information about a current, or real-time, occurrence of an unusual attitude is provided in the form of an image rendered on an attitude display or indicator, generally on a primary flight display (PFD) or head up display (HUD)

Figure 1:
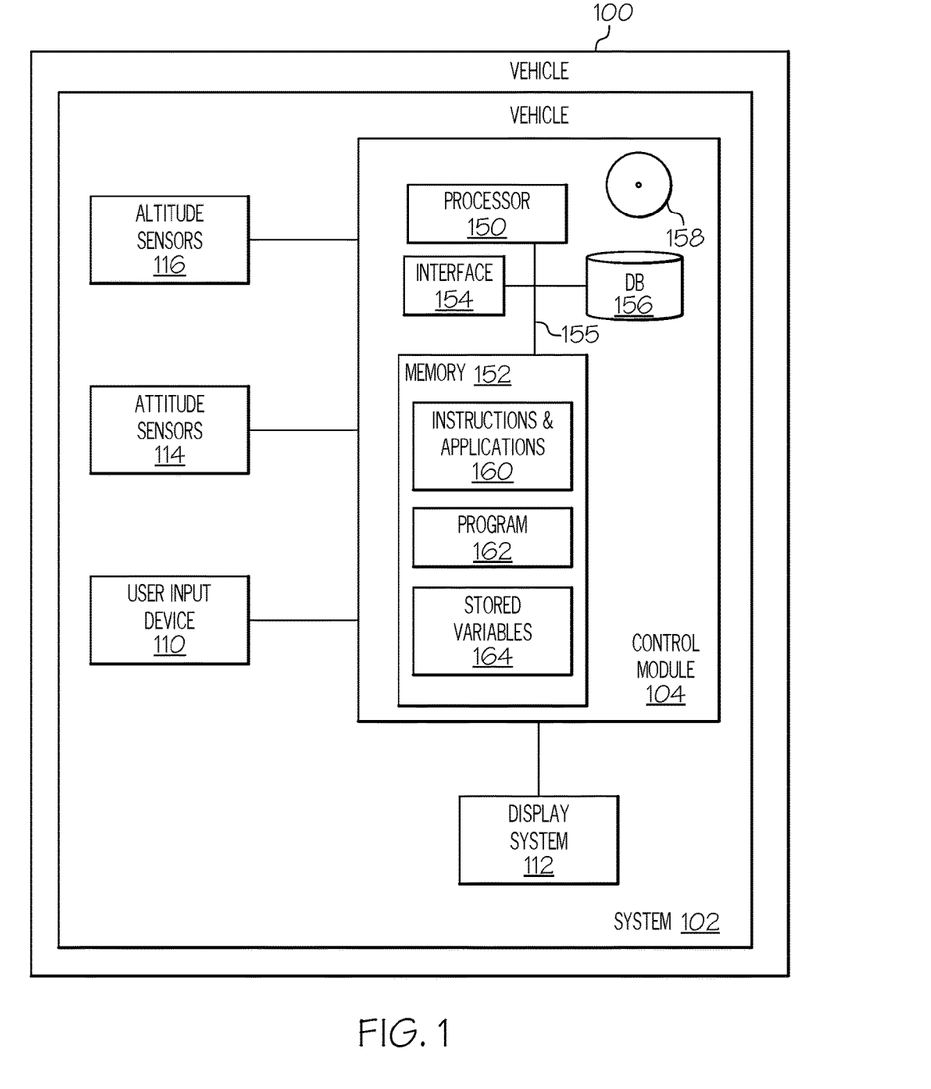
FIG. 1 is a block diagram of an aircraft system according to an exemplary embodiment.

Turning now to FIG. 1, a functional block diagram of a vehicle 100 including vehicle system 102 is depicted, in accordance with various exemplary embodiments. Although the depicted vehicle system 102 is generally realized as an aircraft system within a vehicle 100 that is an aircraft, the concepts presented here can be deployed in a variety of mobile platforms, such as land vehicles, spacecraft, watercraft, and the like. In the depicted embodiment, the vehicle system 102 includes: the control module 104 that is operationally coupled to a user input device 110, a display system 112, attitude sensors 114, and altitude sensors 116. The operation of these functional blocks is described in more detail below. In various embodiments, the vehicle system 102 may be associated with or form part of larger aircraft management system, such as a flight management system (FMS) or a navigation system.

In various embodiments, the user input device 110 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 110 include: entering values for stored variables 164, loading or updating instructions and applications 160, and loading and updating the contents of the database 156, each described in more detail below.

In one exemplary embodiment, the display system 112 may be a panel-mounted head down display (HDD) used in avionics for displaying flight information, as discussed below. Moreover, the display system 112 may be any type of system, including a primary flight display system, a head up display as an overlay, or a head mounted display system, such as a "near to eye display" system. In general, the display system 112 may include any device or apparatus suitable for displaying flight information or other data associated with operation of the aircraft, including various types of computer generated symbols and information representing, for example, pitch, heading, flight path, airspeed, altitude, runway information, waypoints, targets, obstacle, terrain, and RNP data in an integrated, multi-color or monochrome form. In particular, the display system 112 may receive display commands from the processor 150 to display the symbology and graphics discussed below. In this embodiment, the display system 112 is located within a cockpit of the aircraft, vehicle 100. However, it should be appreciated that, in practice, the display system 112 may be located outside the aircraft (e.g., on the ground as part of an air traffic control center or another command center like a remote piloted aircraft).

The display system 112 may be implemented using one or more of any of numerous known display devices suitable for rendering textual, graphic, and/or iconic information in a format viewable by a user. The display devices may provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) or organic LED (OLED) displays. Accordingly, each display device responds to a communication protocol that is either two-dimensional or three, and may support the overlay of text, alphanumeric information, or visual symbology. As described in more detail below, display system 112 may be responsive to user input via user input device 110 and/or be under the control of the control module 104.

The altitude sensors 116 may be any one of or combination of existing altitude sensors, for example barometric altimeter, global positioning systems (GPS), radar altimeter (RADALT), air data computer (ADC), or a geometric altitude calculated from information from the other types of altitude sensors. The attitude sensors 114 may broadly refer to roll-angle and pitch angle information sources, such as an inertial reference system (IRS), attitude and heading reference system (AHRS), separate gyroscopes, and/or other types of sources.

The control module 104 performs the functions of the vehicle system 102. With continued reference to FIG. 1, within the control module 104, the processor 150 and the memory 152 (having therein the program 162) form a processing engine that performs the described processing activities in accordance with the program 162, as is described in more detail below. The control module 104 provides a technological improvement to the conventional display of attitude information, in part, by providing a more comprehensive representation of roll recovery for an occurrence of unusual attitude.

The control module 104 includes an interface 154, communicatively coupled to the processor 150 and memory 152 (via a bus 155), database 156, and an optional storage disk 158. In various embodiments, the control module 104 performs actions and other functions in accordance with steps of a method 600 described in connection with FIG. 6. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. Information in the database 156 may be organized or imported during an initialization step of a process (see initialization 602 FIG. 6).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains the attitude data from attitude sensors 114 and the altitude data from altitude sensors 116 directly. The interface 154 may also include one or more network interfaces to communicate with technicians, and/or one or more storage interfaces to connect to storage apparatuses, such as the database 156.

It will be appreciated that the vehicle system 102 may differ from the embodiment depicted in FIG. 1. As mentioned, the vehicle system 102 can be integrated with an existing flight management system (FMS) Flight control system (FCS), or cockpit display in an aircraft. Additionally, the display system 112 and/or processor 150 may include a graphics display generator for generating the appropriate roll recovery symbology on an image on a screen of the display system 112, as discussed in greater detail below. Particularly, the display system 112 may be a dedicated attitude indicator and/or altitude direction indicator (ADI) that displays current attitude as well as other flight information. As described below, such an attitude indicator may provide a warning or alert of a currently occurring unusual attitude condition. The symbology generated during the roll angle alert condition is described in greater detail below with reference to FIGS. 2-5.

During operation, the processor 150 loads and executes one or more programs, algorithms and rules embodied as instructions and applications 160 contained within the memory 152 and, as such, controls the general operation of the control module 104 as well as the vehicle system 102. In executing the process described herein, such as the method 600 of FIG. 6, the processor 150 loads and specifically executes the program 162, to thereby realize an unconventional technological improvement to both the cockpit display of roll recovery symbology and to the analysis/use of attitude data to determine unusual attitude. Additionally, the processor 150 is configured to process received inputs (any combination of the user input provided via user input device 110, attitude sensors 114, and altitude sensors 116), reference the database 156 in accordance with the program 162, and generate display commands to command and control the display system 112 based thereon.

In operation, the processor 150 receives altitude information from the altitude sensors 116 and attitude information from the attitude sensor 114, including vehicle roll angle information, roll angle rate information, pitch angle information, and/or pitch angle rate information. As used herein, the term "roll angle' may refer to the bank angle, e.g., the difference between the aircraft wings and horizontal. The processor 150 may also receive information about a desired roll angle, which may be based on the phase of flight, the flight conditions, the aircraft type or weight class, etc. For example, the desired roll angle may be horizontal (or zero) or a non-horizontal value, such as during a flight transition. Desired roll and pitch angle information may be based on flight plan information provided to the processor 150. The desired roll angle may comprise predetermined values, and a desired pitch angle may comprise predetermined nose up and/or nose down values.

The control module 104 is configured to determine that unusual attitude conditions are currently underway upon determining any one or combination of the following conditions is occurring: a current bank angle is greater than the absolute value of the predetermined left bank angle; a current bank angle is greater than the absolute value of the predetermined right bank angle; a current pitch angle value is greater than the absolute value of a predetermined pitch up angle; a current pitch angle value is greater than the absolute value of a predetermined pitch down angle. In response to determining that unusual attitude conditions are underway, the control module 104 may assert a roll angle alert and may also determine an associated roll angle correction direction.

The control module 104 generates display commands subsequent to determining the roll angle correction direction.

Figure 2:
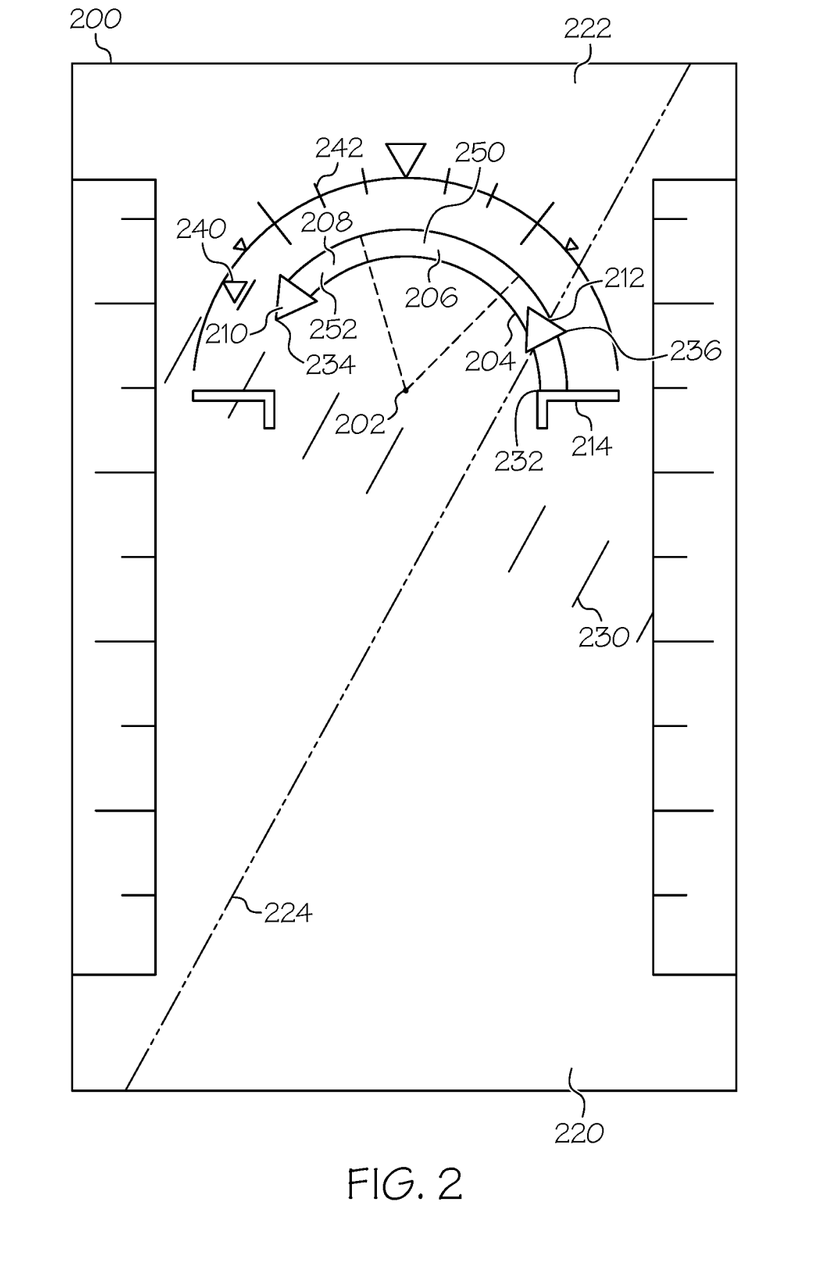
FIG. 2 is an image generated by the aircraft system of FIG. 1 according to an exemplary embodiment.
Figure 3:
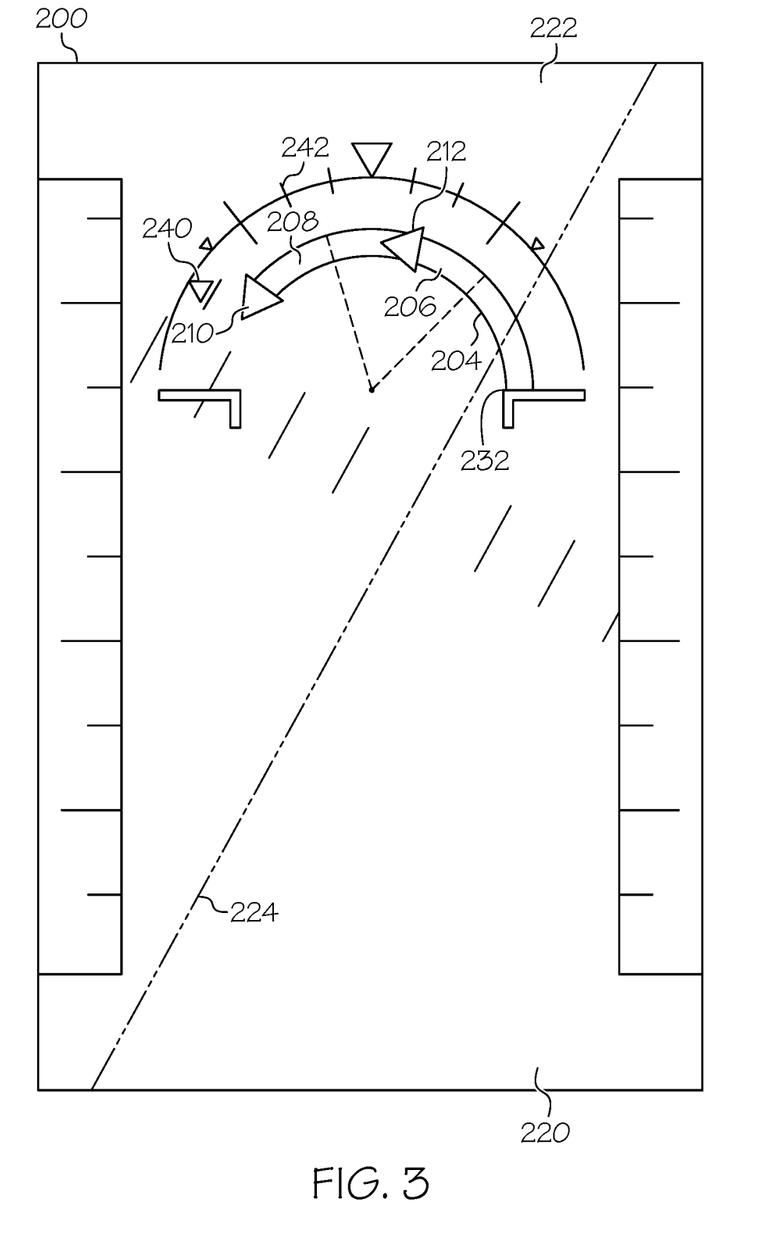
FIG. 3 is an image generated by the aircraft system of FIG. 1 subsequent to the image of FIG. 2 according to an exemplary embodiment.

Responsive to received display commands, the display system 112 renders an image. FIGS. 2 and 3 depict a representative display image (or attitude indicator) 200 that may be displayed on the display system 112 (FIG. 1). Generally, display image 200 is an attitude indicator used to pictorially represent aircraft pitch and roll attitudes. The display image 200 includes horizontal lines or "wings" 214 with a dot 202 between them representing the actual wings and nose of the aircraft. The display image 200 further includes an "attitude sphere" including regions 220 and 222, together with a horizon line 224 representative of the ground, the sky and the horizon, respectively. The display image 200 further includes a pitch tape 230 with a vertical scale that indicates the aircraft pitch attitude with respect to a horizontal plane and a roll angle pointer 240 (or "sky pointer," "roll angle," "zero roll reference position") indicates the roll attitude of the aircraft with respect to the roll scale 242. As such, the pitch tape 230 and roll angle pointer 240 indicate the current pitch and roll angle, respectively. Other symbology may include an altitude scale, a speed scale, and other aircraft symbology. Details of symbology or location of markings on the display image 200 (as well as the display images discussed below) may change form and location from implementation to implementation and display system 112 to display system 112.

FIG. 2 depicts the display image 200 in a first moment of time and FIG. 3 depicts the display image 200 in a subsequent, second moment of time to show the dynamic nature of the roll angle alert symbology 250. The roll angle alert symbology 250 is rendered by the display system 112 responsive to display commands from the processor 150 (FIG. 1) to indicate to the pilot the desired or correct direction for roll recovery when unusual attitude conditions are underway. In the example illustrated by FIGS. 2 and 3, the roll angle alert symbology 250 comprises a transparent solid curved arrow 252 having the characteristics of (i) extending in the roll angle correction direction from a starting point 232 to an ending point 234, (ii) a first arrowhead 210 associated with the ending point 234, and (iii) a second arrowhead 212 aligned in the same direction as the first arrowhead 210. It is to be understood that "aligned in the same direction as the first arrowhead" implies that the second arrowhead 212 stays on the shaft of the curved arrow 252, at its current location, but points along the curved arrow 252 in the same direction as the first arrowhead. The base or starting point 232 of the curved arrow is positioned at the wings 214, extending to an ending point 234. The ending point 234 is aligned with the roll angle pointer 240. The second arrowhead 212 dynamically traces the curved arrow 252 from a beginning point 236 to the ending point 234, and then back to the beginning point 236. In various embodiments, the second arrowhead dynamically traces at a frequency that is based on a difference between the current attitude and a desired attitude.

The curved arrow 252 may be any suitable color, transparency, and outline to enhance situational awareness. In the exemplary embodiments of FIGS. 2, 3, 4, and 5, the curved arrow 252/452 has a circular arc with respect to the dot 202, although other curved shapes may be provided. In some embodiments, the beginning point 236 is the same as the starting point 232. As will be described in more detail in connection with FIGS. 4 and 5, in other embodiments, the beginning point 236 may be different from the starting point 232.

Further, the curved arrow 252 may comprise color attributes. As an example, the curved arrow 252 may comprise two or more subsections, each rendered in a manner that is visually distinct from the other, and wherein the first subsection 208 comprises the first arrowhead 210 and indicates a desired side to roll toward and the second subsection 204 comprises the starting point 232 and indicates an undesirable side to roll to. For example, the first subsection 208 may be rendered green, to indicate a desired side to roll to, and the second subsection 204 may be rendered red, to indicate an undesirable side to roll to. In various embodiments, a third subsection 206 may also be rendered, for example, in yellow, and in between the first subsection 208 and the second subsection 204, to indicate a cautionary transition between the first subsection 208 and the second subsection 204.

As noted above, the curved arrow 252 is orientated in the direction of the corrective roll action to return to an appropriate or desired attitude. The display system 112 may be configured to render the roll angle alert symbology 250 only when unusual attitude conditions are detected, or only when the roll angle alert is asserted.

Figure 4:
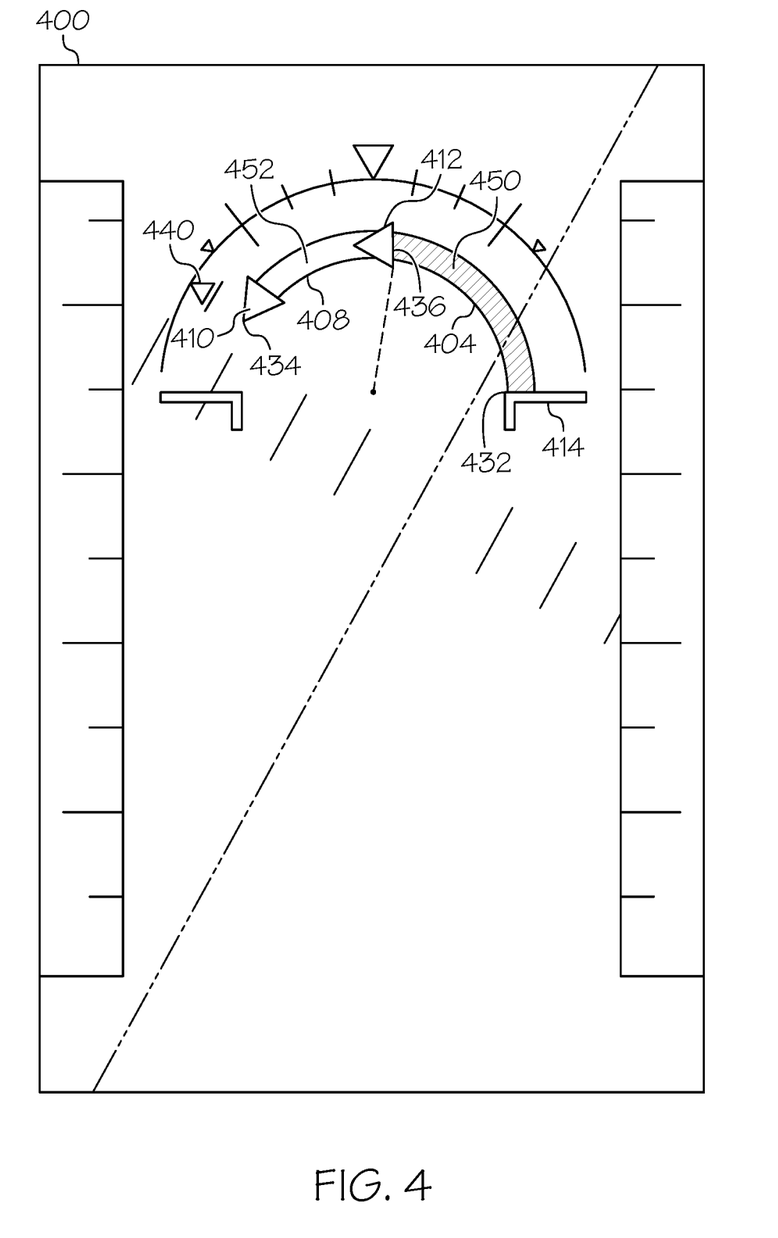
FIG. 4 is an image generated by the aircraft system of FIG. 1 according to an alternate exemplary embodiment.
Figure 5:
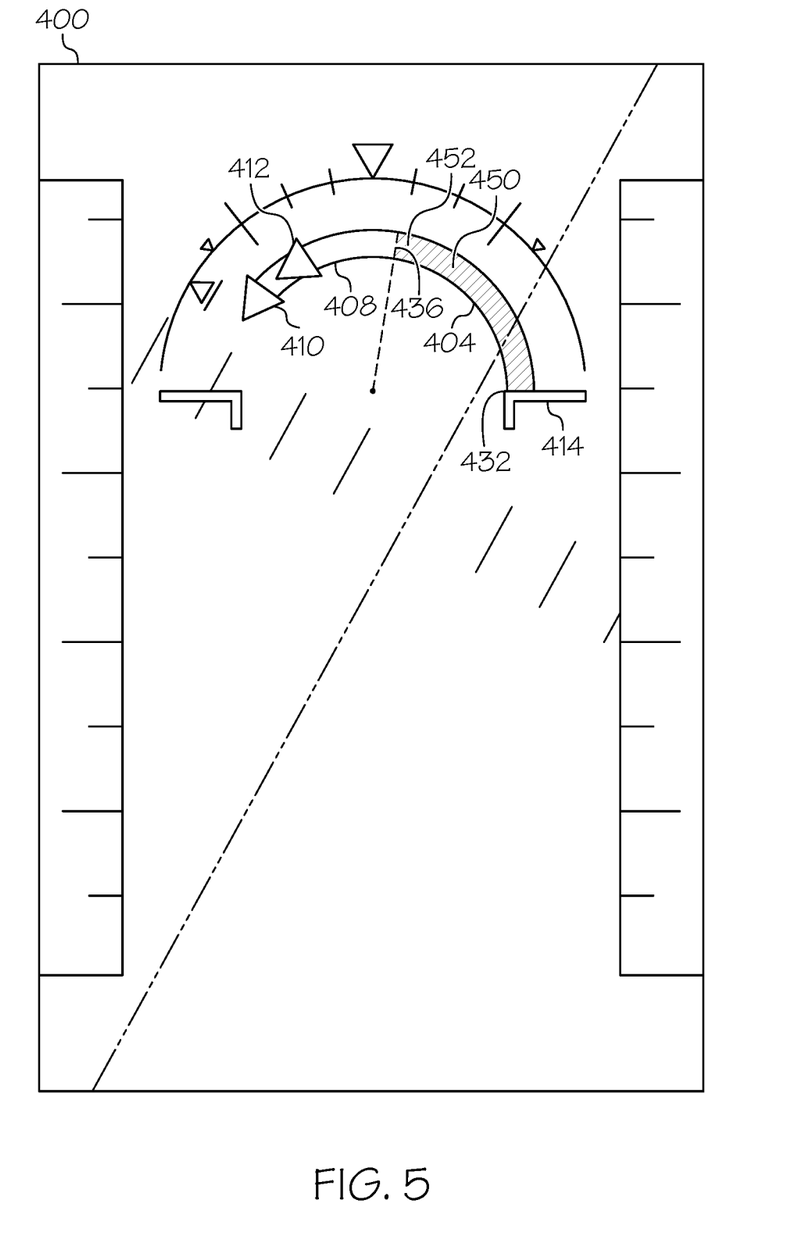
FIG. 5 is an image generated by the aircraft system of FIG. 1 subsequent to the image of FIG. 4 according to an alternate exemplary embodiment.

Turning now to FIGS. 4 and 5, in display image 400, the beginning point 236 is shown as being in a different location from the starting point 232. Similar to the display image 200 of FIGS. 2 and 3, FIG. 4 depicts the image 400 in a first moment of time and FIG. 5 depicts the image 400 in a subsequent, second moment of time to show the dynamic nature of the second arrowhead 412 in the roll angle alert symbology 450.

Similar to FIGS. 2 and 3, the roll angle alert symbology 450 comprises a transparent solid curved arrow 452 having the characteristics of (i) extending in the roll angle correction direction from a starting point 432 to an ending point 434, (ii) a first arrowhead 410 associated with the ending point 434, and (iii) a second arrowhead 412 aligned in the same direction as the first arrowhead 410, on the shaft of the curved arrow 452, at its current location. The base or starting point 432 of the curved arrow 452 is positioned at the wings 414, extending to an ending point 434. The ending point 434 is aligned with the roll angle pointer 440. The curved arrow 452 may be any suitable color, transparency, and outline to enhance situational awareness. The second arrowhead 412 dynamically traces the curved arrow 452 from a beginning point 436 to the ending point 434, and then back to the beginning point 436.

In FIG. 4 and FIG. 5, the curved arrow 452 comprises two subsections, each rendered in a manner that is visually distinct from the other, and wherein the first subsection 408 comprises the first arrowhead 410 and indicates a desired side to roll to and the second subsection 404 comprises the starting point 432 and indicates an undesirable side to roll to. As before, the first subsection 408 may be rendered green, to indicate a desired side to roll to, and the second subsection 404 may be rendered red, to indicate an undesirable side to roll to. In the depicted embodiment, the first subsection 208 and the second subsection 204 each occupy approximately half of the length or extension of the curved arrow 452, but in other embodiments, this may vary.

The embodiments shown in FIGS. 2-5 depict a technological improvement to the conventional display of attitude information. Specifically, with the tracing second arrowhead (212, 412), the direction to recover from unusual attitude conditions is more clearly shown, therefore, situational awareness of the appropriate roll recovery action is increased. The color attributes for various subsections (204, 206, 208, and 404 and 408) further enhance situational awareness, however, based in part on the tracing nature of the second arrowhead (412, 212); the technological improvements provided by the control module 104 are also observable on display systems 112 that are monochrome. Further, as shown in FIGS. 4 and 5, by confining the dynamic tracing performed by the second arrowhead 412 to the desired side to roll to, the direction to recover from unusual attitude conditions is more specifically and clearly shown. It is to be understood that the roll angle may be positive, in which case the direction of the arrows 252 and 452 would be reversed (sweeping clockwise).

Figure 6:
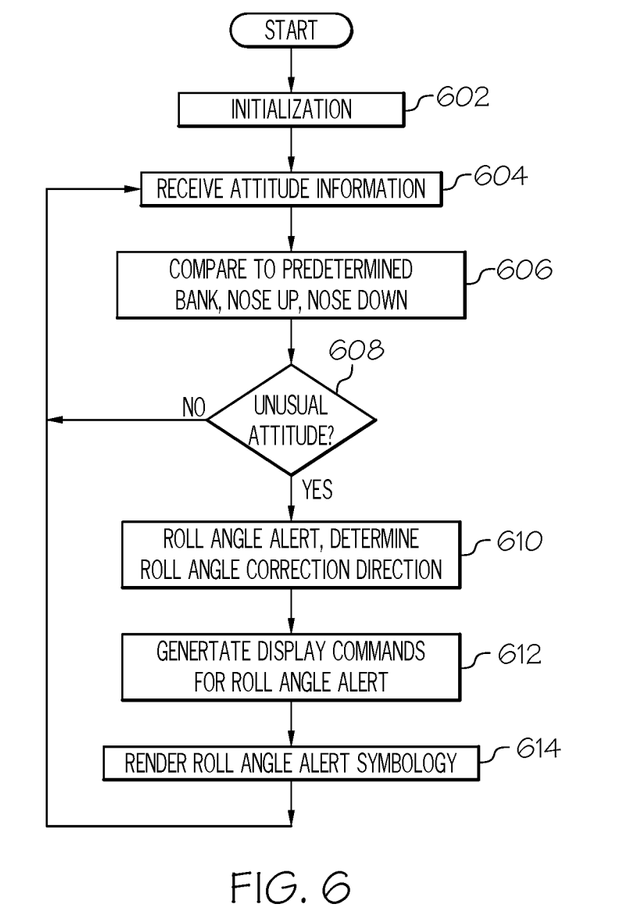
FIG. 6 is a flow chart for a method for unusual attitude recovery, according to a further exemplary embodiment.

In a further exemplary embodiment, the vehicle system 102 discussed above may be used to implement a method 600 for displaying unusual attitude recovery, as shown in the flow chart of FIG. 6. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

The method starts, and at 602 the control module 104 is initialized. As mentioned above, initialization may comprise uploading or updating instructions and applications 160, program 162, stored variables 164, and the various lookup tables stored in the database 156. Generally, predetermined variables include, for example, predetermined bank (predetermined left bank, predetermined right bank), predetermined nose/pitch up, predetermined nose/pitch down values, and various shapes and various colors and/or visually distinguishing techniques used for the roll angle alert symbology. In some embodiments, the program 162 includes additional instructions and rules for rendering information differently based on type of display device in display system 112.

At 604, attitude information is received from attitude sensors 114. Altitude information may also be received at 604. At 606, received attitude information is processed and compared to a predetermined bank. Predetermined bank may include a plus and minus predetermined bank value, or a single value to be used as an absolute value. Information processed at 606 is compared to conditions defined in the rules and program 162 as being unusual attitude. Specifically, the method evaluates whether a current bank is greater than an absolute value of the predetermined bank. In the embodiment, the absolute value creates a range, within which the current bank is acceptable, but exceeding it on either side defines an occurrence of unusual attitude, in which a roll angle alert may be asserted. At 608, if it is determined that an unusual attitude is currently underway, the method 600 moves to 610. At 610, a roll angle alert is asserted and a roll angle correction direction is determined. At 612, the method generates display commands associated with the roll angle alert. At 614, responsive to the display commands, roll angle alert symbology is rendered on a display system 112. Subsequent to 614, the method may end or may return to 604.

The symbology discussed above may vary as necessary or desired. As an example, the curved arrows (252, 452) depicted above are generally outlined and transparent, although in other embodiments, the curved arrows may be semi-transparent, solid arrow, and/or have dynamic transparencies. An outlined curved arrow may prevent or mitigate clutter with other aspects of the display. In some embodiments, the symbology at the wings (214, 414) may tie a curved arrow to a rolling axis of the vehicle 100. The arrowheads (210, 212, 410, 412) may also have alternate arrowhead shapes and sizes, including a more swept arrow head or square arrow head. In various embodiments, additional arrowheads may be employed.

Accordingly, the exemplary embodiments discussed above provide enhanced systems and methods for displaying attitude and unusual attitude correction directions. In particular, the provided systems and methods are operational on monochrome as well as color display systems 112, and the tracing movement of the second arrowhead (212, 412) in the direction to recover from unusual attitude conditions is more clearly shown, therefore, situational awareness of the appropriate roll recovery action is increased.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle system comprising:
a memory device; and
a processor coupled to the memory device, the processor configured to:
receive current attitude data;
process the current attitude data with a predetermined bank angle;
determine an associated roll angle correction direction upon determining
a current bank angle value is greater than an absolute value of the predetermined bank angle;
generate display commands responsive to the roll angle correction direction; and
a display device configured to receive the display commands and,
responsive thereto, to selectively render an image including roll angle alert symbology, the roll angle alert symbology comprising a curved arrow having the characteristics of (i) extending in the roll angle correction direction from a starting point to an ending point, (ii) a first arrowhead associated with the ending point, and (iii) a second arrowhead aligned in the same direction as the first arrowhead,
wherein the second arrowhead dynamically traces the curved arrow from a beginning point to the ending point, and then back to the beginning point.

2. The vehicle system of claim 1, wherein the beginning point is in between the starting point and the ending point on the curved arrow.

3. The vehicle system of claim 1, wherein the second arrowhead dynamically traces at a frequency that is based on a difference between the current attitude and a desired attitude.

4. The vehicle system of claim 1, wherein the display device is configured to only display the roll angle alert symbology when a roll angle alert is asserted.

5. The vehicle system of claim 1, The vehicle system of claim 1, wherein the curved arrow comprises a first and a second subsection, each rendered in a manner that is visually distinct from the other, and wherein the first subsection comprises the first arrowhead and indicates a desired side to roll toward and the second subsection comprises the starting point and indicates an undesirable side to roll to.

6. The vehicle system of claim 5, wherein the beginning point is a point on the curved arrow where the first subsection originates.

7. The vehicle system of claim 6, wherein the first subsection is rendered in green and the second subsection is rendered in red.

8. The vehicle system of claim 7, wherein the ending point is substantially in line with a roll angle pointer.

9. The vehicle system of claim 8, wherein the image further includes wing symbology, and wherein the starting point of the curved arrow is rendered at the wing symbology.

10. The vehicle system of claim 9, wherein a radius and a thickness of the curved arrow is based on features of the display device.

11. A vehicle display method, comprising:
receiving current attitude data from attitude sensors;
processing the current attitude data with a predetermined bank, a predetermined nose up and a predetermined nose down;
determining an associated roll angle correction direction upon determining a current bank is greater than an absolute value of the predetermined bank; and
generating display commands responsive to the roll angle correction direction; and
at a display device, receiving the display commands and, responsive thereto, to selectively rendering an image including roll angle alert symbology, the roll angle alert symbology comprising a curved arrow having the characteristics of (i) extending in the roll angle correction direction from a starting point to an ending point, (ii) a first arrowhead associated with the ending point, and (iii) a second arrowhead aligned in the same direction as the first arrowhead, wherein the second arrowhead dynamically traces the curved arrow from a beginning point to the ending point, and then back to the beginning point.

12. The method of claim 11, further comprising rendering, on the image, wing symbology, and wherein the starting point of the curved arrow is at the wing symbology.

13. The method of claim 12, further comprising rendering the second arrowhead to dynamically trace at a frequency that is based on a difference between the current attitude and a desired attitude.

14. The method of claim 13, further comprising rendering the beginning point in between the starting point and the ending point on the curved arrow.

15. The method of claim 14, further comprising rendering the roll angle alert symbology only when a roll angle alert is asserted.

16. The method of claim 15, The method of claim 1, wherein the curved arrow comprises a first and a second subsection, each rendered in a manner that is visually distinct from the other, and wherein the first subsection comprises the first arrowhead and indicates a desired side to roll to and the second section comprises the starting point and indicates an undesirable side to roll to.

17. The method of claim 16, wherein the beginning point is a point on the curved arrow where the first subsection originates.

18. The method of claim 17, wherein the first subsection is rendered in green and the second subsection is rendered in red.

19. The method of claim 16, wherein the ending point is substantially in line with a roll angle pointer.

20. A dynamic unusual attitude roll recovery system for an aircraft, comprising:
a control module comprising a memory device and a processor, the control module configured to:
receive current attitude data; and
process the current attitude data with a predetermined bank; and
while a current bank is greater than an absolute value of the predetermined bank,
determine an associated roll angle correction direction, and
generate display commands responsive to the roll angle correction direction; and
a display device configured to receive the display commands and,
responsive thereto, to selectively render an image including roll angle alert symbology, the roll angle alert symbology comprising a curved arrow having the characteristics of (i) extending in the roll angle correction direction from a starting point to an ending point, (ii) a first arrowhead associated with the ending point, (iii) a first and a second subsection, each rendered in a manner that is visually distinct from the other, the first subsection comprising the first arrowhead and indicating a desired side to roll toward and the second section comprising the starting point and indicating an undesirable side to roll to, and (iv) a second arrowhead aligned in the same direction as the first arrowhead,
wherein the second arrowhead dynamically traces the first curved arrow from a beginning point to the ending point, and then back to the beginning point, and the beginning point is in between the starting point and the ending point on the curved arrow.

* * * * *